(12) United States Patent
Srinivasan et al.

(10) Patent No.: US 9,577,957 B2
(45) Date of Patent: Feb. 21, 2017

(54) FACILITATING CONGESTION CONTROL IN A NETWORK SWITCH FABRIC BASED ON GROUP TRAFFIC RATES

(71) Applicant: Oracle International Corporation, Redwood City, CA (US)

(72) Inventors: Arvind Srinivasan, San Jose, CA (US); Shimon Muller, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 131 days.

(21) Appl. No.: 14/612,713

(22) Filed: Feb. 3, 2015

(65) Prior Publication Data

US 2016/0226772 A1 Aug. 4, 2016

(51) Int. Cl.
| | |
|---|---|
| *H04L 1/00* | (2006.01) |
| *H04L 12/947* | (2013.01) |
| *H04L 12/801* | (2013.01) |
| *H04L 12/819* | (2013.01) |
| *H04L 12/851* | (2013.01) |
| *H04L 12/825* | (2013.01) |
| *H04L 12/823* | (2013.01) |

(52) U.S. Cl.
CPC ............. *H04L 49/25* (2013.01); *H04L 47/12* (2013.01); *H04L 47/215* (2013.01); *H04L 47/24* (2013.01); *H04L 47/2441* (2013.01); *H04L 47/263* (2013.01); *H04L 47/29* (2013.01); *H04L 47/32* (2013.01)

(58) Field of Classification Search
CPC ........... H04L 47/02; H04L 47/10; H04L 45/22; H04L 12/28; H04L 47/21; H04W 28/08; H04J 3/16; H04J 3/22
USPC .... 370/231.1, 235, 237, 253, 400, 232, 397, 370/389, 396, 412
See application file for complete search history.

(56) References Cited

U.S. PATENT DOCUMENTS

2002/0107908 A1* 8/2002 Dharanikota ....... H04L 41/5003
709/203

* cited by examiner

*Primary Examiner* — Chi H Pham
*Assistant Examiner* — Alexander O Boakye
(74) *Attorney, Agent, or Firm* — Park, Vaughan, Fleming & Dowler LLP

(57) ABSTRACT

The disclosed embodiments relate to a system for communicating packets through a network switch fabric. During operation, at an aggregation point in the network switch fabric, the system segregates packet flows from multiple sources into a set of quality-of-service (QoS) buckets. Next, the system monitors traffic rates for each QoS bucket. The system then determines a state for each QoS bucket by comparing a traffic rate for the QoS bucket with one or more state-specific thresholds. When a packet is subsequently received for a given QoS bucket, the system performs an action based on a state of the given QoS bucket.

17 Claims, 6 Drawing Sheets

FACILITATING CONGESTION CONTROL IN A NETWORK SWITCH FABRIC BASED ON GROUP TRAFFIC RATES

BACKGROUND

High-performance computing systems often include large numbers of servers interconnected by a network switch fabric that is responsible for communicating packets to and from the servers. Each of these servers can potentially run multiple virtual machines (VMs) and associated virtualized applications, and the network packet streams generated by these servers are typically directed to different resources that the VMs and associated virtualized applications need to access. Hot spots and associated network congestion frequently arise in such network switch fabrics depending on the patterns of the packet streams and how the switch fabric is configured.

In an exemplary configuration, a high-performance Infiniband™ network switch fabric can be used to connect a large number of servers with an Ethernet™ gateway. In this configuration, traffic through the Ethernet gateway comprises virtualized traffic streams associated with VMs that execute on various servers in the data center. In general, traffic streams to and from the VMs have stringent requirements for traffic isolation and independent policy enforcement. For example, some of these policies could be related to traffic management, firewalls, and L3-L7 packet-processing.

In a network switch fabric, hot spots frequently arise at points in the network hierarchy where traffic from multiple sources tends to aggregate. For example, a virtual switch (vSwitch) uplink node aggregates traffic from multiple VMs, a NIC port aggregates traffic from multiple vSwitches, a network tier uplink node aggregates traffic from multiple NIC ports, and so on. These hot spots can adversely affect the performance of the VMs and virtualized applications running in the network hierarchy.

Hence, what is needed is a technique for managing hot spots and associated network congestion in a network switch fabric.

SUMMARY

The disclosed embodiments relate to a system for communicating packets through a network switch fabric. During operation, at an aggregation point in the network switch fabric, the system segregates packet flows from multiple sources into a set of quality-of-service (QoS) buckets. Next, the system monitors traffic rates for each QoS bucket. The system then determines a state for each QoS bucket by comparing a traffic rate for the QoS bucket with one or more state-specific thresholds. Finally, when a packet is received for a given QoS bucket, the system performs an action based on a state of the given QoS bucket.

In some embodiments, if the given QoS bucket is associated with an uncongested state, performing the action comprises forwarding the packet to a destination for the packet without performing a traffic-control operation.

In some embodiments, if the given QoS bucket is associated with a moderately congested state, performing the action comprises sending a congestion notification packet (CNP) to: (1) a source of the packet; (2) another addressable aggregation point higher up in the network switch fabric hierarchy (which is also referred to as a "source" of the packet); (3) a management entity for the network switch fabric; or (4) an entity chosen by the management entity. The CNP indicates that the source is oversubscribed and should start rate-limiting packets sent through the aggregation point.

In some embodiments, if the given QoS bucket is associated with a heavily congested state, performing the action comprises dropping the packet.

In some embodiments, when the source of the packet receives the CNP, the source commences rate-limiting packets sent through the aggregation point.

In some embodiments, sending the CNP to the source comprises one of the following: (1) sending the CNP at regular, periodic intervals to the source; (2) sending the CNP more frequently at a time of initial transition into the moderately congested state, and less frequently as more congestion is detected; or (3) sending the CNP less frequently at a time of initial transition into the moderately congested state, and more frequently as more congestion is detected.

In some embodiments, segregating the packet flows into the set of QoS buckets comprises classifying packets received at the aggregation point based on a combination of: (1) Ethernet L2-L4 headers; and (2) Infiniband™ headers that represent a source of the packet.

In some embodiments, the state-specific thresholds associated with transitions between an uncongested state and a moderately congested state comprise: (1) a maximum uncongested threshold that causes a transition from the uncongested state to the moderately congested state; and (2) a minimum moderately congested threshold that causes a transition from the moderately congested state to the uncongested state. The maximum uncongested threshold can be higher than the minimum moderately congested threshold, thereby introducing hysteresis into transitions between the uncongested and moderately congested states to reduce frequent transitions between the uncongested and moderately congested states. The same technique can also be used to provide hysteresis for transitions between the moderately congested state and the heavily congested state.

DETAILED DESCRIPTION

Overview

Figure 1:
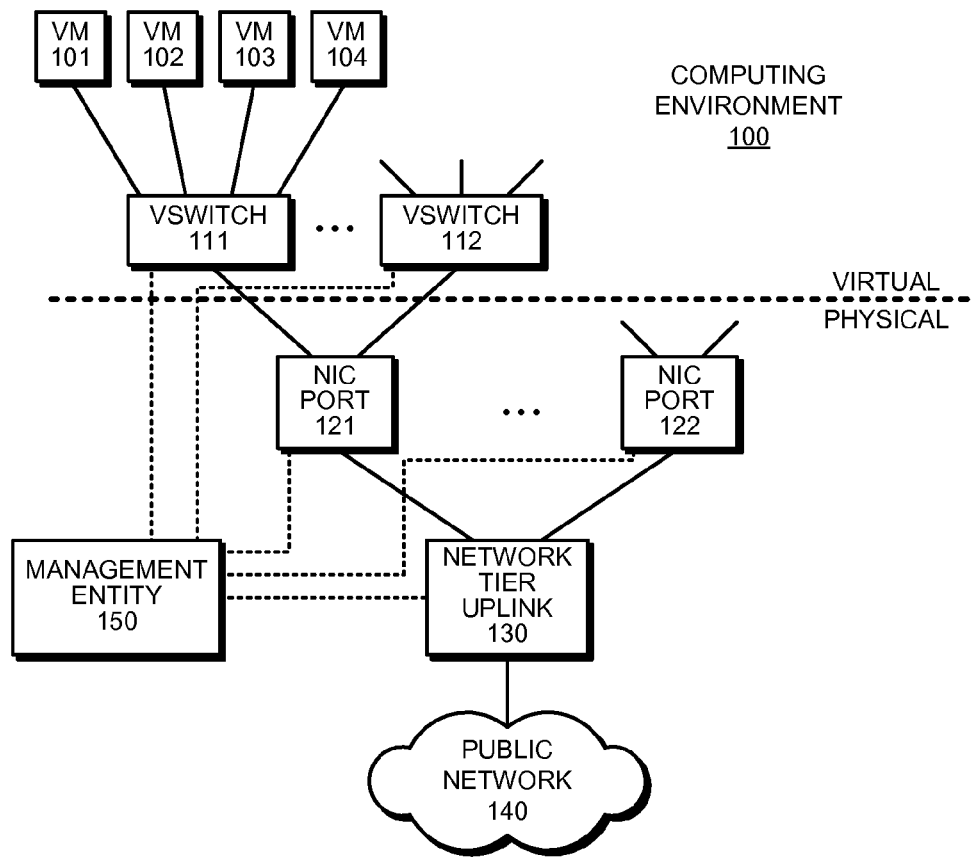
FIG. 1 illustrates an exemplary computing environment 100 in accordance with the disclosed embodiments.

In high-performance computing systems comprising a collection of servers, a network switch fabric is often used to move packets to and from the servers. With servers running multiple VMs and associated virtualized applications, packet streams from a server are commonly directed to different services that the VMs and associated applications seek to access. Depending on the traffic patterns and how the switch fabric is configured, network congestion can arise at various locations in the switch fabric. In particular, interconnections within a switch fabric are often organized as a fan-in tree having many-to-one connections among layers, wherein the layers can be comprised of hardware or software. For example, as illustrated in FIG. 1, traffic from multiple VMs 101-104 can be aggregated at a single virtual switch (vSwitch) 111. Next, traffic from multiple virtual switches 111-112 can be aggregated at a hardware network interface controller (NIC) port 121, which behaves as an uplink port for its associated vSwitches and VMs. Finally, traffic from multiple NIC ports 121-122 can be aggregated at a single network tier uplink 130 that connects to a public network 140 such as the Internet. We refer to these many-to-one connections as "aggregation points." Note that the VMs 101-104 and vSwitches 111-112 are "virtual entities" that are implemented in software, whereas NIC ports 121-122 and network tier uplink 130 are "physical entities" that are implemented in hardware. Also, note that the aggregation points (including vSwitches 111-112, NIC ports 121-122 and network tier uplink 130) can operate under control of a management entity 150, which performs various management operations, such as allocating bandwidth for traffic groups, and specifying which addressable entity should be notified when a traffic rate threshold is exceeded.

Hot spots that arise at aggregation points can be remedied by providing sufficient network capacity to handle potential hot spots. However, providing sufficient network capacity to handle the maximum possible traffic at each aggregation point is unnecessarily expensive because a given aggregation point is unlikely to simultaneously receive traffic on all of its incoming links. It is preferable to build a cheaper network that provides less network capacity, wherein some network links are oversubscribed and can potentially cause hot spots. For example, the bottom layer of a network hierarchy can potentially oversubscribe the higher-layer nodes in the hierarchy, and so on up the hierarchy, wherein oversubscription can occur at any layer.

The embodiments described below provide a framework for efficiently managing traffic that crosses congested uplink nodes (e.g., vSwitches, gateways, etc.), wherein the framework can be implemented recursively at each aggregation point. To make such a system work effectively, a predefined level of quality of service (QoS) can be provisioned for each traffic source across one or more layers in the hierarchy. At each layer the system needs to have some method of identifying where each packet comes from (e.g., a source address) to facilitate segregating packet flows. Next, after the source of a packet is identified, the system performs a policing operation, which can involve rate-limiting packets from the source, or telling the source that it is oversubscribed and should stop transmitting. Note that a source server running network applications typically has a significant amount of memory, and hence can retain the packet until it is notified that congestion is no longer present. Although the disclosed embodiments are described in the context of a Virtualized Infiniband™ Network Fabric Switch, the same techniques can be applied to other types of switch fabrics.

During operation of the system, L2-L4 flows from various sources can be identified and segregated into different QoS buckets. This can be accomplished by classifying L2 flows (MAC, VLAN) into transparent classification handles, wherein each transparent handle is associated with a set of policies to be applied to a given flow. The classification handle can be derived from a combination of: (1) Ethernet L2-L4 headers (MAC, VLAN, EtherType, protocol, etc.); and (2) IB headers that represent the source of the packet (for example, SLID, SGID, SQPn . . . for an IB network with an Ethernet gateway.)

The overall traffic management technique can be implemented using a distributed management framework. For example, in a network switch fabric, which is comprised of a combination of homogeneous IB HCAs (or NICs) and IB switches, the traffic management can be distributed and hierarchically approached among different nodes. Once the traffic rates are provisioned, the aggregation node identifies the potential rate violations and can inform the source of a violation by means of a gratuitous message, which is sent to an addressable entity associated with the source.

Each aggregation point manages traffic among its participants. For example, an IB Switch port (e.g., an Ethernet gateway) can manage traffic among all the ports sourcing packets into the port. The IB HCA (vSwitch uplink/aggregation node) can manage traffic among all its VMs that are sending outbound traffic.

Each classification handle can be mapped to a bandwidth-allocation bucket associated with a traffic policy group, and these buckets can be provisioned with a certain expected traffic rate. Moreover, each bucket can be associated with multiple traffic regions as described below:

Green Region: No traffic control is needed if the traffic remains below a rate that defines the upper bound for this region.

Yellow Region: A gratuitous message can be sent to the source of a packet once traffic exceeds a threshold, and the packet's source can be informed about the number of violations so far. The source can act on this information by detecting the exact offender and reducing its traffic rate. If the offender's rate continues to increase, the system can enable packet drops for the offender's traffic. If the rate decreases, another gratuitous message can be sent indicating the congestion has been reduced.

Red Region: The system can start dropping packets, until the traffic rate decreases to rates associated with the yellow or green regions.

In general, when a source is below its provisioned traffic rate, which can be defined by a committed burst size (CBS), it falls in the green region wherein no traffic control is required. On the other hand, when the source exceeds its provisioned traffic rate, it falls into the yellow region, wherein the system can send a gratuitous message to an addressable entity associated with the source. This addressable entity can be any of the following: (1) an IB HCA/NIC; (2) a hardware or software vSwitch on a host server; (3) a proxy agent running somewhere within the network fabric that is responsible for provisioning; (4) another aggregation point above the current aggregation point in the hierarchy; and (5) all of the above coordinating their actions. Finally, if the source exceeds another rate defined by an extended burst size (EBS), it falls into the red region and the system can start dropping packets from the source.

Traffic Policy Groups

Figure 2:
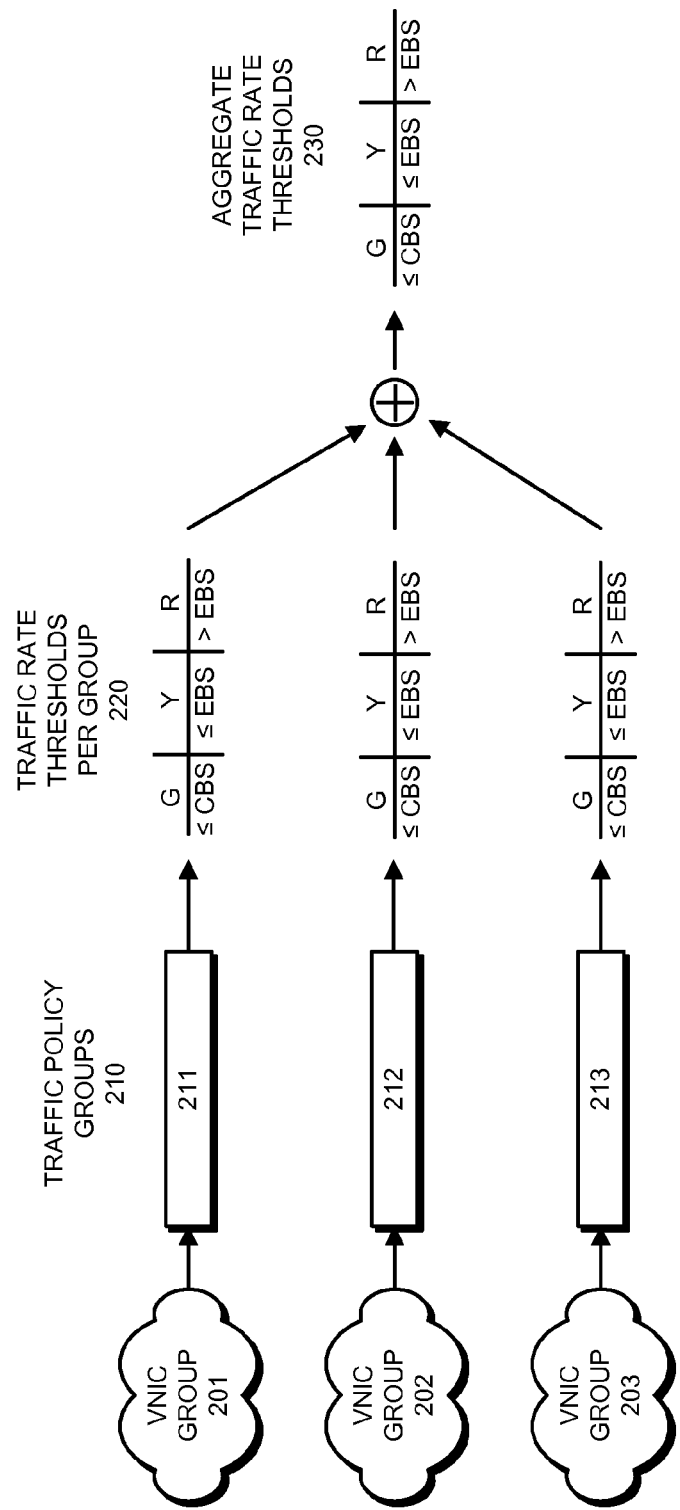
FIG. 2 illustrates how packets from different packet flows are associated with different congestion states in accordance with the disclosed embodiments.

FIG. 2 illustrates how different traffic policy groups can be associated with different traffic regions. For example, packets that arrive at an aggregation point can be associated with different VNIC groups 201-203, and the packets for the VNIC groups 201-203 can be assigned to corresponding traffic policy groups 210. More specifically, VNIC group 201 can be assigned to traffic policy group 211, VNIC group 202 can be assigned to traffic policy group 212, and VNIC group 203 can be assigned to traffic policy group 213.

The system can also maintain different traffic rate thresholds for each group 220, so that: (1) if the traffic rate for a group is less than or equal to a rate defined by a CBS, the group falls into the green region; (2) if the traffic rate for a group is greater than the rate defined by the CBS and is less than or equal to a rate defined by an EBS, the group falls into the yellow region; and (3) if the traffic rate for a group is greater than the rate defined by the EBS, the group falls into the red region.

The system can also add the traffic rates for all of the traffic policy groups together to produce an "aggregate traffic rate," wherein corresponding aggregate traffic rate thresholds 230 can be applied to the aggregate traffic rate. This aggregate traffic rate can be useful in some situations. For example, the system can allow a traffic group to exceed its allocated bandwidth without adverse consequences if the aggregate traffic rate at the aggregation point has not been exceeded.

Processing Packet Flows

Figure 3:
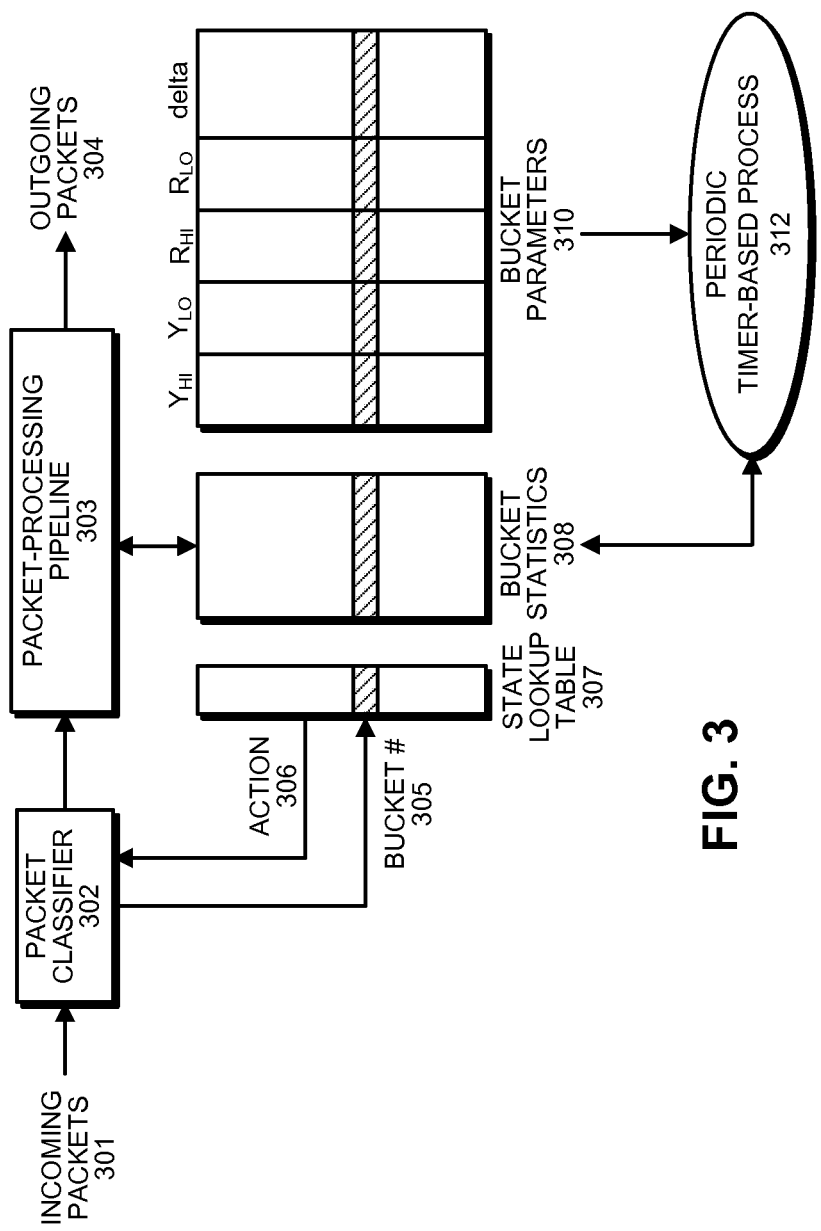
FIG. 3 illustrates structures within an aggregation point for processing packets in accordance with the disclosed embodiments.

FIG. 3 illustrates various structures within an aggregation point for processing packet flows in accordance with the disclosed embodiments. Referring to FIG. 3, incoming packets 301 feed into a packet classifier 302 that classifies packets into different buckets associated with traffic policy groups. (The packets then feed through packet-processing pipeline 303 to produce outgoing packets 304.) A bucket number 305 from packet classifier 302 can be used to perform a lookup into state lookup table 307, which returns an associated action 306 (e.g., forwarding a packet, sending a CNP to packet source, or dropping a packet).

The system can also maintain a set of bucket statistics 308 that is updated to reflect incoming packets. For example, bucket statistics 308 can include a simple byte counter that increments every time a packet is scheduled for the bucket. Periodically, a timer-based process 312 reads the statistics and decrements a "bandwidth allowed" value from the current value. As these numbers are updated, the current statistics are compared against various thresholds and the state bits are set accordingly.

The system additionally maintains a set of bucket parameters 310, which includes threshold values $Y_{HI}$, $Y_{LO}$, $R_{HI}$, $R_{LO}$ and delta. Note that the system provides two threshold values for transitions between different traffic regions to facilitate hysteresis for the transitions to reduce the number of transitions between regions. For example, a bucket transitions from the green region to the yellow region when the traffic rate exceeds $Y_{HI}$, but does not transition back to the green region unless the traffic rate falls below $Y_{LO}$. Similarly, the bucket transitions from the yellow region to the red region when the traffic rate exceeds $R_{HI}$, but does not transition back to the yellow region unless the traffic rate falls below $R_{LO}$. The set of bucket parameters 310 can also include a "bandwidth allowed" parameter (not shown) that represents how much of the allocated bandwidth was used. This bandwidth allowed value can be periodically subtracted from the current statistics value. If the bandwidth allowed value is larger than the amount by which the traffic rate was incremented for the time period, the traffic remains in the green region. If the bandwidth allowed value is less than the amount by which the traffic rate was incremented for the time period, the difference indicates the amount of bandwidth that was exceeded.

For every active bucket, a state can be maintained that represents the action that needs to be taken whenever a packet arrives for it. Note that the state for each bucket can change independently of the other buckets and is determined based on how the bucket's parameters are configured and the bucket's traffic profile. Some of the actions associated with the states are listed below:

Drop the Packet: This state represents the red region and indicates that the traffic has exceeded its allocated bandwidth. This state will persist until the traffic drops below $R_{LO}$.

Send Congestion Notification: This state represents the yellow region. In this state, a gratuitous notification is sent to the packet source so that the source can take action on the flow that is violating its allocated bandwidth. If multiple host VMs are tied to a bucket, then the managing entity for the aggregation node is notified. For example, a set of servers can be part of the same QoS group and managed as one entity. Within the yellow state, there can exist multiple sub-states, wherein each of these sub-states represents the extent of violation within the yellow region. These sub-states can be represented using different shades of yellow for different sub-regions. The sub-regions can be divided equally based on bandwidth, and additional configuration parameters can be provided to indicate which sub-transitions require notifications. (Note that the delta value in the set of bucket parameters 310 can specify the bandwidth difference between sub-regions.) Also, the notifications can take place at periodic or regular intervals. For example, notifications can be more frequent at the time of initial transition into the yellow region, and can become less frequent as more congestion is detected. Alternatively, the notifications can be less frequent at the time of initial transition into the yellow region, and can become more frequent as more congestion is detected. Also, depending on the type of host software/hardware and the type of actions, all or a subset of the above techniques can be used.

Forward the Packet: This state represents the case where all the traffic is within the configured range.

Processing Packets Based on Group Traffic Rates

Figure 4A:
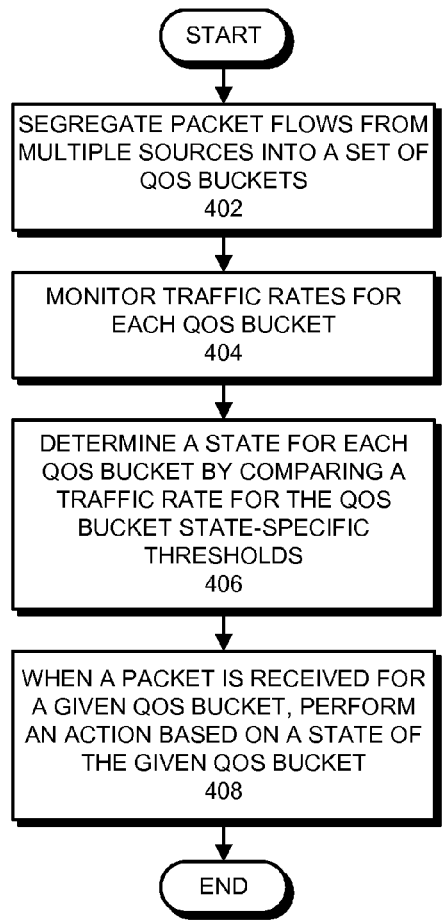
FIGS. 4A and 4B present flow charts illustrating how packets are processed in an aggregation point based on group traffic rates in accordance with the disclosed embodiments.
Figure 4B:
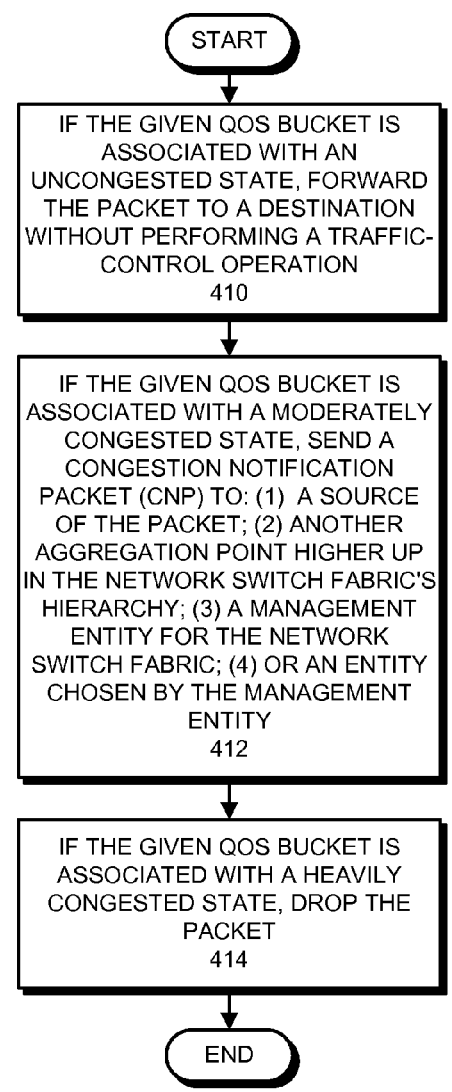

FIGS. 4A and 4B present flow charts illustrating how packets are processed at an aggregation point based on group traffic rates in accordance with the disclosed embodiments. During operation, the system segregates packet flows from multiple sources into a set of quality-of-service (QoS) buckets (step 402). The system subsequently monitors traffic rates for each QoS bucket (step 404). Next, the system determines a state for each QoS bucket by comparing a traffic rate for the QoS bucket with one or more state-specific thresholds (step 406).

When a packet is subsequently received for a given QoS bucket, the system performs an action based on a state of the given QoS bucket (step 408). If the given QoS bucket is associated with an uncongested state, the system forwards the packet to its destination without performing a traffic-control operation (step 410). If the given QoS bucket is associated with a moderately congested state, the system sends a congestion notification packet (CNP) to: (1) a source of the packet; (2) another addressable aggregation point higher up in the network switch fabric hierarchy (which is also referred to as a "source" of the packet); (3) a management entity for the network switch fabric; or (4) an entity chosen by the management entity. The CNP indicates that the source is oversubscribed and should start rate-limiting packets sent through the aggregation point (step 412). If the given QoS bucket is associated with a heavily congested state, the system drops the packet (step 414).

Processing Packets Based on Group and Aggregate Traffic Rates

Figure 5A:
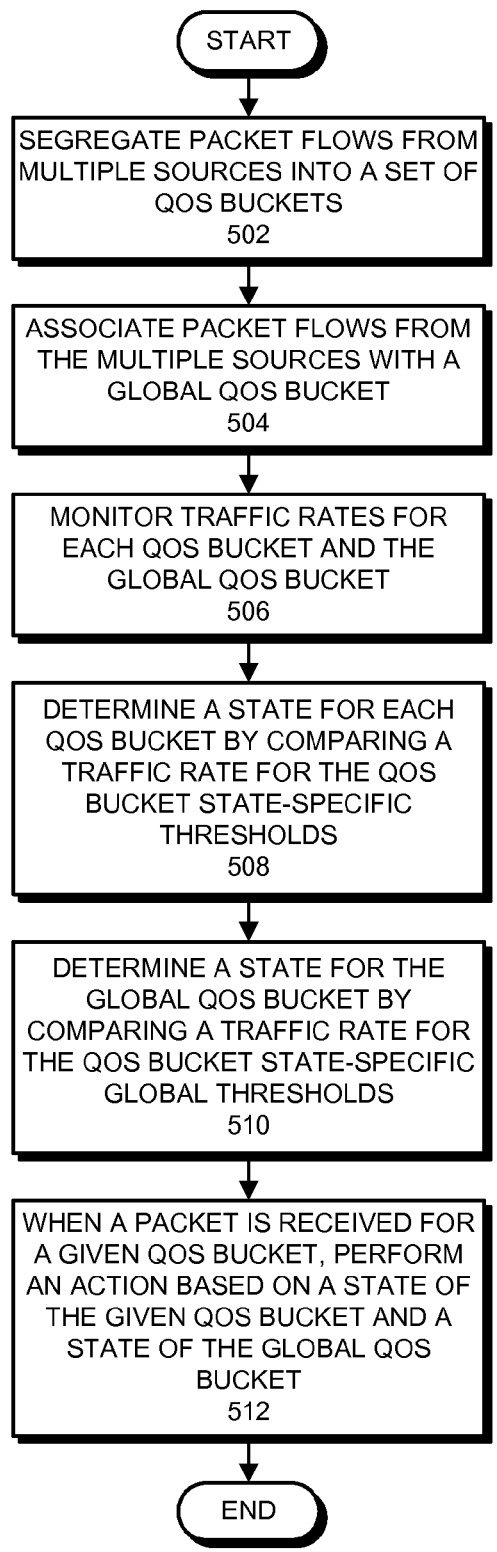
FIGS. 5A and 5B present flow charts illustrating how packets are processed in an aggregation point based on group traffic rates and aggregate traffic rates in accordance with the disclosed embodiments.
Figure 5B:
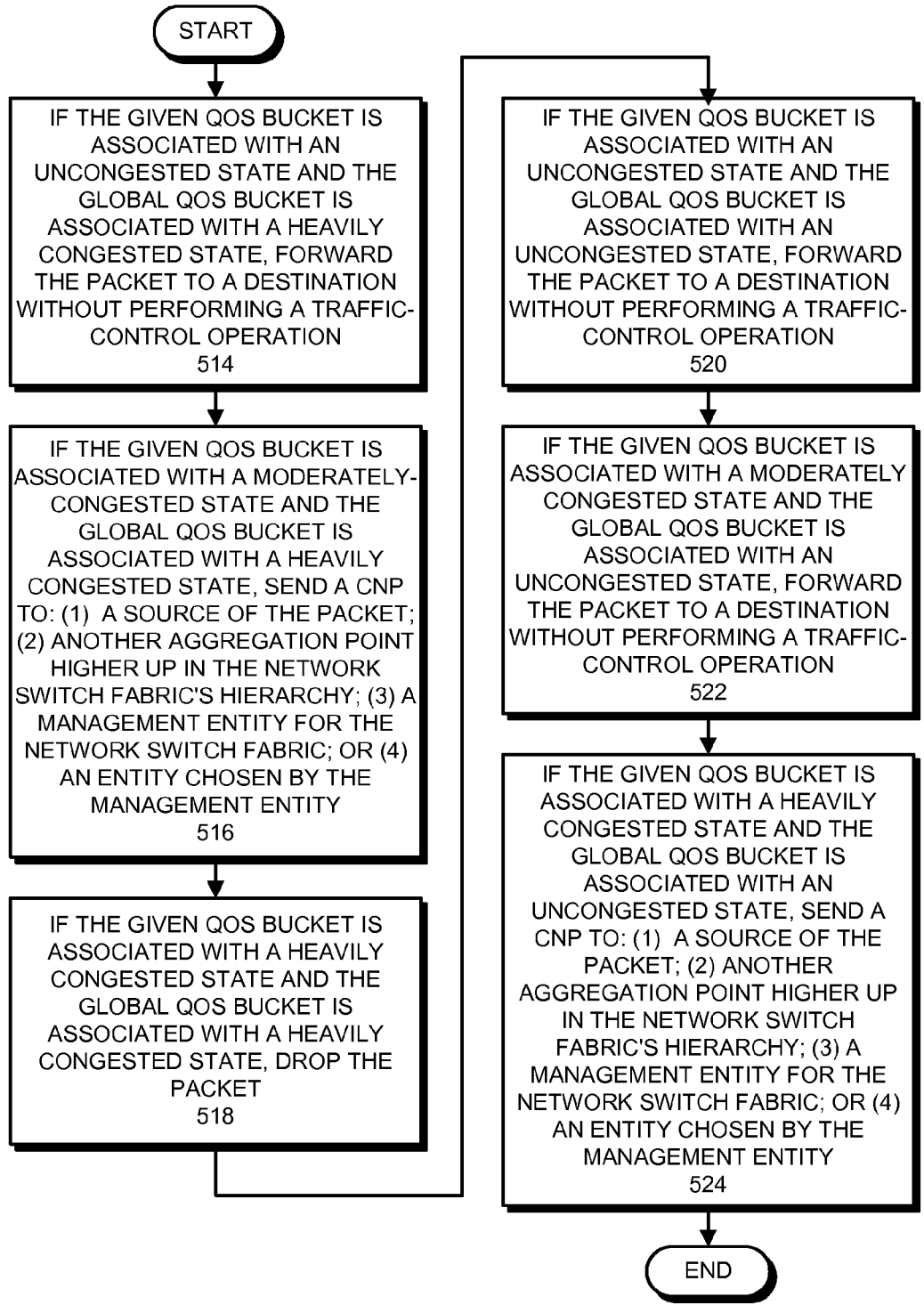

FIGS. 5A and 5B present flow charts illustrating how packets are processed at an aggregation point based on group traffic rates and aggregate traffic rates in accordance with the disclosed embodiments. During operation, the system segregates packet flows from multiple sources into a set of quality-of-service (QoS) buckets (step 502). The system also associates packet flows from the multiple sources with a global QoS bucket (step 504). Next, the system monitors traffic rates for each QoS bucket and the global QoS bucket (step 506). The system then determines a state for each QoS bucket by comparing a traffic rate for the QoS bucket with one or more state-specific thresholds (step 508). The system also determines a state for the global QoS bucket by comparing a traffic rate for the global QoS bucket with one or more state-specific global thresholds (step 510).

When a packet is subsequently received for a given QoS bucket, the system performs an action based on a state of the given QoS bucket and a state of the global QoS bucket (step 512). If the given QoS bucket is associated with an uncongested state and the global QoS bucket is associated with a heavily congested state, the system forwards the packet to a destination for the packet without performing a traffic-control operation (step 514). If the given QoS bucket is associated with a moderately congested state and the global QoS bucket is associated with a heavily congested state, the system sends a congestion notification packet (CNP) to: (1) the packet's source; (2) another addressable aggregation point higher up in the network switch fabric hierarchy (which is also referred to as a "source" of the packet); (3) a management entity for the network switch fabric; or (4) an entity chosen by the management entity. The CNP indicates that the source is oversubscribed and should start rate-limiting packets sent through the aggregation point (step 516). If the given QoS bucket is associated with a heavily congested state and the global QoS bucket is associated with a heavily congested state, the system drops the packet (step 518).

On the other hand, if the given QoS bucket is associated with an uncongested state and the global QoS bucket is associated with an uncongested state, the system forwards the packet to its destination without performing a traffic-control operation (step 520). If the given QoS bucket is associated with a moderately congested state and the global QoS bucket is associated with an uncongested state, the system forwards the packet to its destination without performing a traffic-control operation (step 522). Finally, if the given QoS bucket is associated with a heavily congested state and the global QoS bucket is associated with an uncongested state, the system sends a congestion notification packet (CNP) to: (1) the packet's source; (2) another addressable aggregation point higher up in the network switch fabric hierarchy (which is also referred to as a "source" of the packet); (3) a management entity for the network switch fabric; or (4) an entity chosen by the management entity. The CNP indicates that the source is oversubscribed and should start rate-limiting packets sent through the aggregation point (step 524).

The detailed description that appears above is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Moreover, the foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A method for communicating packets through a network switch fabric, comprising:
   at an aggregation point in the network switch fabric, segregating packet flows from multiple sources into a set of quality-of-service (QoS) buckets;
   monitoring traffic rates for each QoS bucket in the set of QoS buckets;
   determining a state for each QoS bucket in the set of QoS buckets by comparing a traffic rate for the QoS bucket with one or more state-specific thresholds; and
   when a packet is received for a given QoS bucket, performing an action based on a state of the given QoS bucket;
   wherein if the given QoS bucket is associated with a moderately congested state, performing the action comprises sending a congestion notification packet (CNP) to: a source of the packet; another addressable aggregation point higher up in the network switch fabric hierarchy; a management entity for the network switch fabric; or an entity chosen by the management entity, wherein the CNP indicates that the source is oversubscribed and should start rate-limiting packets sent through the aggregation point.

2. The method of claim 1, wherein if the given QoS bucket is associated with an uncongested state, performing the action comprises forwarding the packet to a destination for the packet without performing a traffic-control operation.

3. The method of claim 1, wherein if the given QoS bucket is associated with a heavily congested state, performing the action comprises dropping the packet.

4. The method of claim 1, wherein when the source of the packet receives the CNP, the source commences rate-limiting packets sent through the aggregation point.

5. The method of claim 1, wherein sending the CNP to the source comprises one of the following:
sending the CNP at regular, periodic intervals to the source;
sending the CNP more frequently at a time of initial transition into the moderately congested state, and less frequently as more congestion is detected; and
sending the CNP less frequently at a time of initial transition into the moderately congested state, and more frequently as more congestion is detected.

6. The method of claim 1, wherein segregating the packet flows into the set of QoS buckets comprises classifying packets received at the aggregation point based on a combination of:
Ethernet L2-L4 headers; and
Infiniband headers that represent a source of the packet.

7. The method of claim 1, wherein the state-specific thresholds associated with transitions between an uncongested state and a moderately congested state comprise:
a maximum uncongested threshold that causes a transition from the uncongested state to the moderately congested state; and
a minimum moderately congested threshold that causes a transition from the moderately congested state to the uncongested state;
wherein the maximum uncongested threshold is higher than the minimum moderately congested threshold, thereby introducing hysteresis into transitions between the uncongested and moderately congested states to reduce frequent transitions between the uncongested and moderately congested states.

8. A non-transitory computer-readable storage medium storing instructions that when executed by a computer cause the computer to perform a method for communicating packets through a network switch fabric, the method comprising:
at an aggregation point in the network switch fabric, segregating packet flows from multiple sources into a set of quality-of-service (QoS) buckets;
monitoring traffic rates for each QoS bucket in the set of QoS buckets;
determining a state for each QoS bucket in the set of QoS buckets by comparing a traffic rate for the QoS bucket with one or more state-specific thresholds; and
when a packet is received for a given QoS bucket, performing an action based on a state of the given QoS bucket;
wherein if the given QoS bucket is associated with a moderately congested state, performing the action comprises sending a congestion notification packet (CNP) to: a source of the packet; another addressable aggregation point higher up in the network switch fabric hierarchy; a management entity for the network switch fabric; or an entity chosen by the management entity, wherein the CNP indicates that the source is oversubscribed and should start rate-limiting packets sent through the aggregation point.

9. The non-transitory computer-readable storage medium of claim 8, wherein if the given QoS bucket is associated with an uncongested state, performing the action comprises forwarding the packet to a destination for the packet without performing a traffic-control operation.

10. The non-transitory computer-readable storage medium of claim 8, wherein if the given QoS bucket is associated with a heavily congested state, performing the action comprises dropping the packet.

11. The non-transitory computer-readable storage medium of claim 8, wherein when the source of the packet receives the CNP, the source commences rate-limiting packets sent through the aggregation point.

12. The non-transitory computer-readable storage medium of claim 8, wherein the state-specific thresholds associated with transitions between an uncongested state and a moderately congested state comprise:
a maximum uncongested threshold that causes a transition from the uncongested state to the moderately congested state; and
a minimum moderately congested threshold that causes a transition from the moderately congested state to the uncongested state;
wherein the maximum uncongested threshold is higher than the minimum moderately congested threshold, thereby introducing hysteresis into transitions between the uncongested and moderately congested states to reduce frequent transitions between the uncongested and moderately congested states.

13. A system that communicates packets, comprising:
a network switch fabric with a plurality of input and output ports, wherein an aggregation point in the network switch fabric is configured to:
segregate packet flows from multiple sources into a set of quality-of-service (QoS) buckets;
monitor traffic rates for each QoS bucket in the set of QoS buckets;
determine a state for each QoS bucket in the set of QoS buckets by comparing a traffic rate for the QoS bucket with one or more state-specific thresholds; and
when a packet is received for a given QoS bucket, perform an action based on a state of the given QoS bucket;
wherein if the given QoS bucket is associated with a moderately congested state, performing the action comprises sending a congestion notification packet (CNP) to: a source of the packet; another addressable aggregation point higher up in the network switch fabric hierarchy; a management entity for the network switch fabric; or an entity chosen by the management entity, wherein the CNP indicates that the source is oversubscribed and should start rate-limiting packets sent through the aggregation point.

14. The system of claim 13, wherein if the given QoS bucket is associated with an uncongested state, performing the action comprises forwarding the packet to a destination for the packet without performing a traffic-control operation.

15. The system of claim 13, wherein if the given QoS bucket is associated with a heavily congested state, performing the action comprises dropping the packet.

16. The system of claim 13, wherein when the source of the packet receives the CNP, the source is configured to commence rate-limiting packets sent through the aggregation point.

17. The system of claim 13, wherein the state-specific thresholds associated with transitions between an uncongested state and a moderately congested state comprise:
- a maximum uncongested threshold that causes a transition from the uncongested state to the moderately congested state; and
- a minimum moderately congested threshold that causes a transition from the moderately congested state to the uncongested state;
- wherein the maximum uncongested threshold is higher than the minimum moderately congested threshold, thereby introducing hysteresis into transitions between the uncongested and moderately congested states to reduce frequent transitions between the uncongested and moderately congested states.

* * * * *